US00RE42691E

(19) United States
(12) Reissued Patent
Aylor

(10) Patent Number: US RE42,691 E
(45) Date of Reissued Patent: Sep. 13, 2011

(54) EYEWEAR

(76) Inventor: Robert Benson Aylor, Blue Ash, OH (US)

(21) Appl. No.: 12/005,404

(22) Filed: Dec. 26, 2007

Related U.S. Patent Documents

Reissue of:
(64) Patent No.: 7,040,753
Issued: May 9, 2006
Appl. No.: 10/875,135
Filed: Jun. 23, 2004

(51) Int. Cl.
*G02C 5/12* (2006.01)

(52) U.S. Cl. ..... 351/136; 351/123; 351/139

(58) Field of Classification Search ..... 351/78–82, 351/123, 136–139
See application file for complete search history.

(56) References Cited

U.S. PATENT DOCUMENTS

| | | | | |
|---|---|---|---|---|
| 2,032,843 | A | 12/1934 | Grier | |
| 2,561,402 | A | 7/1951 | Nelson | |
| 3,684,356 | A | 8/1972 | Bates | |
| 4,070,104 | A | 1/1978 | Rice | |
| 4,131,341 | A | 12/1978 | Bradley, Jr. | |
| 4,165,925 | A | 8/1979 | Donovan | |
| 4,662,729 | A * | 5/1987 | Dobson | 351/123 |
| 4,783,163 | A | 11/1988 | Breault | |
| 4,964,716 | A | 10/1990 | Combs | |
| 5,054,903 | A | 10/1991 | Jannard et al. | |
| 5,907,385 | A | 5/1999 | Flores et al. | |
| 6,065,834 | A * | 5/2000 | Willhite | 351/122 |
| 6,283,594 | B1 | 9/2001 | Hamano | |
| 6,610,382 | B1 | 8/2003 | Kobe et al. | |
| 2002/0126253 | A1 | 9/2002 | Wu | |
| 2003/0203155 | A1 * | 10/2003 | Kobe et al. | 428/119 |
| 2006/0200927 | A1 * | 9/2006 | Kacher et al. | 15/208 |

FOREIGN PATENT DOCUMENTS

| | | |
|---|---|---|
| EP | 1345067 | 9/2003 |
| GB | 468443 | 7/1937 |
| JP | 10-39260 | * 2/1998 |
| WO | WO 00/22475 | 4/2000 |
| WO | WO 00/36453 | 6/2000 |

OTHER PUBLICATIONS

Hollen and Sanders, Textiles, Fourth Edition, 1973, pp. 154-161, Macmillan Publishing Co., Inc., New York, New York USA.
Tortora, Understanding Textiles, 1978, pp. 201-204 and 223, Macmillan Publishing Co., Inc., New York, New York, USA.

* cited by examiner

*Primary Examiner* — Huy K Mai

(57) ABSTRACT

Improved eyeglasses are disclosed that have improvements in comfort, safety, wear ability, and convenience, based upon improvements in the contact (bearing) surfaces where the eyeglasses touch the body by providing air passages, hydrophobic surfaces and/or ratchet-tooth-like structures to promote motion from the bottom of the lenses in front toward the end of earpieces in the back of the head; to methods, articles, etc. for providing such improvements; and to methods for improving acceptance of such improved eyeglasses, especially improved methods of doing business.

20 Claims, 1 Drawing Sheet

EYEWEAR

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to: improved eyewear, e.g., eyeglasses, which have improvements in comfort, safety, wear ability, and convenience, based upon improvements in the contact (bearing) surfaces where the eyeglasses touch the body; to methods, articles, etc. for providing such improvements; and to methods for improving acceptance of such improved eyeglasses, especially improved methods of doing business.

2. Description of Related Art

The art includes the use of pads on the nosepieces of eyeglasses to improve comfort, one example being described in U.S. Pat. No. 4,070,104, Rice, issued Jan. 24, 1978. This patent describes spaced parallel tubing mounted on the pad, said tubing being compressed against the sides of the nose to provide a cushion when the eyeglasses are in use.

U.S. Pat. No. 4,964,716 to Combs, issued Oct. 23, 1990, states that prior art discloses "Foam rubber nose pads, ribbed pads or pads formed with a rough surface have been devised to hold a pair of eyeglasses in position on a wearer's nose. Such nose pads are permanently formed as a part of the eyeglasses; are permanently mounted on the eyeglass nose pads, typically through the use of an adhesive; or are removably attached to the eyeglass frames via screws or snap-in projections. In addition, such nose pads have been specifically formed for a particular size and shape eyeglass frame." The '716 patent discloses pads for nosepieces of eyeglasses with a Velcro™ connection where the pad surface is "Preferably, a fabric material, such as cotton, corduroy, etc." The patent states: "FIG. 2 depicts one embodiment of the sheet 38 in which the sheet 38 is formed of a ribbed, corduroy material. This material includes a plurality of thin, spaced ribs 44 which extend along the length of one side of the sheet 38. Such ribs 44 provide additional adhesion of the sheet 38 to the nose of a wearer of the eyeglasses 14 and prevent or minimize slippage of the eyeglasses 14 down the nose of the wearer." In FIG. 2 the corduroy is mounted so that the ribs are roughly horizontal. Corduroy is traditionally made of cotton fibers.

U.S. Pat. No. 5,907,385 issued to Flores et al. May 25, 1999, discloses pads for both the nosepiece and earpieces of eyeglasses, said pads having adhesive to attach the pads to the eyeglasses and adhesive to attach the pads to the skin.

Pads designed to keep eyeglasses in place in U.S. Pat. No. 6,283,594, issued to Hamano, Sep. 4, 2001 are attached to the nose and the eyeglasses by adhesive and magnetic means for keeping the two pads in contact.

Other attempts to keep eyewear in place are disclosed in: U.S. Pat. No. 2,561,402 to Nelson, issued July 1951; U.S. Pat. No. 3,684,356 to Bates, issued August 1972; U.S. Pat. No. 4,783,163, to Breault, issued on Nov. 8, 1988 (discloses non-adhesive means for attaching nose pads to eyeglasses); and U.S. Pat. No. 5,054,903 to Jannard et al. issued Oct. 8, 1991.

There are several commercially available products, which are pads that have glue on one side, covered by a "release sheet" that is removed so the pads can be attached to the nosepieces of eyeglasses. These products are typically advertised to provide improved resistance to slippage and/or comfort. Usually, the material is some kind of foam that provides only limited compressibility.

BRIEF SUMMARY OF THE INVENTION

The present invention optimizes the contact/bearing surfaces of eyeglasses where the eyeglasses contact the body (skin) by providing contact surfaces that either: (a) have air passageways to allow more air to reach the skin and are more hydrophobic than skin so as to minimize retention of moisture at the skin surface and provide improved skin dryness; (b) have reduced resistance to slippage over skin in the direction from the bottom of the eyeglass lenses to the ends of the earpieces as opposed to in the direction from the ends of the earpieces to the bottom of the eyeglass lenses (less resistance to slippage in the upward and/or backward directions as compared to the downward and/or frontward directions) to aid in keeping the eyeglasses in position; or, (c) preferably, both (a) and (b).

DETAILED DESCRIPTION OF THE INVENTION

Figure 1:
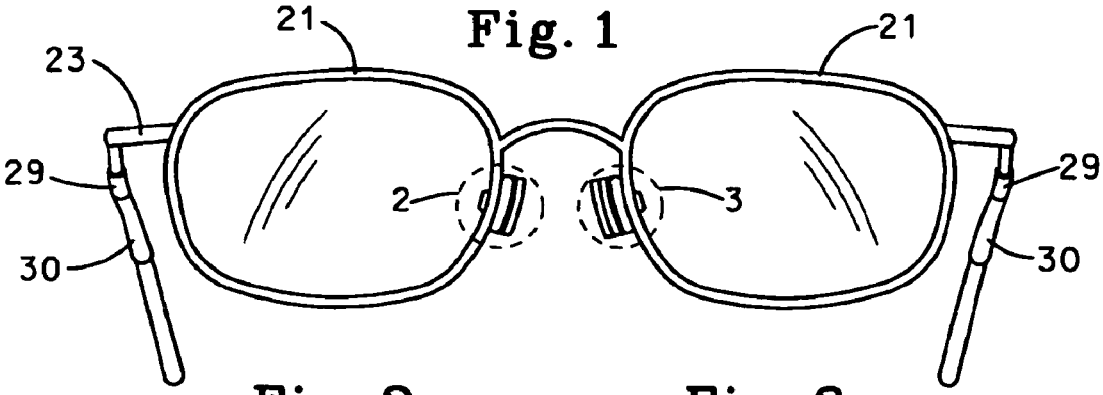
FIG. 1 is a schematic front view of a pair of eyeglasses with nose pads attached.

A. The Problems Solved by the Invention

Eyeglasses normally have lenses, a frame, nosepieces and earpieces. They have to fit snugly in order to maintain them in the proper orientation. A comfortable "snug fit" is hard to achieve and maintain. A snug fit forces the eyeglasses against the skin, which can result in pain if the force is too great and/or trapping of moisture next to the skin. Eyeglasses can become uncomfortable after long periods of wear and over time the frames can become loose, resulting in poor fit. It is extremely difficult to obtain and maintain a proper balance between comfort and a fit that keeps the eyeglasses in the proper position. When the glasses are not fitted snugly, they slip forward toward the front (face) and/or downward on the face due to movement of the head and/or the force of gravity. The user then has to push the eyeglasses back into position constantly.

Where the eyeglasses make contact with skin, the skin can become sore and irritated, especially when the skin becomes wet from trapped moisture. Skin irritation can even result in infection if the irritation is not eliminated and/or treated. The problem of skin irritation caused by eyeglasses is similar to the problem caused by a bandage that prevents air from reaching the skin. Moisture released by the skin is trapped and the moist skin becomes irritated over time.

The pain and/or irritation resulting from tight-fitting eyeglasses can cause the wearer to remove the eyeglasses. Failure to wear eyeglasses can be extremely harmful, not only to the user who must live without corrected sight and/or eye protection, but also to others if the person in need of eyeglasses is driving a car, operating dangerous equipment, etc. Everyone is affected when there is an accident involving injury. Insurance rates are affected by such accidents. Insurance companies have a very strong interest in preventing eye damage and having people use eyewear. Society has a strong interest in maintaining the effective vision of everyone.

People who wear safety glasses or goggles, which are often heavier than ordinary glasses, and people who wear sunglasses are likely to remove them rather than suffer the pain. The resulting damage to the eyes from flying objects, the sun's rays, etc., can be expensive and keep people from work and/or from enjoying their life.

Commercial pads that are sold for attachment to the nosepieces of eyeglasses are helpful, but are not a completely satisfactory solution. Commercial pads appear to have essentially non-porous materials for skin contact surfaces so moisture is still trapped. The foams that are available in such pads appear to be closed cell foams that do not allow air to circulate freely to and from the skin surface. The pads help resist slippage, but the glasses still slip. There are apparently no commercial pads for the earpieces of eyeglasses.

Eye care professionals do not have a satisfactory solution for preventing skin irritation. Also, when eyeglasses become loose due to bending or deformation during use, the normal solution is a trip to the eye care professional's office to have the eyeglasses adjusted. Eye care professionals have a strong interest in making sure their patients have good fitting eyewear that is worn and in minimizing the need for office visits to have the eyewear readjusted.

The present invention can help solve (1) the problem of skin irritation and/or (2) the problem of slippage.

B. The Solutions

1. The Solutions to the Problem of Skin Irritation

The solution to the problem of skin irritation is to create eyeglasses having skin contact surfaces, e.g., on nosepieces and/or earpieces, preferably on both, that allow air to contact the skin, and that are relatively hydrophobic as compared to skin so as to minimize the retention of moisture at the skin surface. The surfaces of the nosepieces and/or earpieces can be formed from hydrophobic materials and with sufficient air passageways to provide aeration of the skin and to minimize moisture retention or, but preferably, "pads" are attached to create such surfaces.

The prior art does not suggest that skin irritation due to eyeglasses can be minimized and/or eliminated by increasing airflow to the skin and reducing moisture retention on the skin. However, the use of any surface on the earpieces and nosepieces of eyeglasses that will allow for increased aeration of the skin and that will minimize moisture retention will help minimize the potential for skin irritation.

(a) The "Hard Surface" Solution to Providing Aeration of the Skin

In order to provide air contact with the skin, there need to be sufficiently large "valleys" on the contact surfaces that allow air to penetrate to all of the skin between the "peaks" so that the skin does not fill in or block the valleys. Also, the rough surface should be hydrophobic to assist moisture in being transported away from the skin. Retained moisture will harbor bacteria, fungus, etc. and can even block the air passageways.

Hard rough hydrophobic surfaces for improved aeration of the skin and minimized moisture retention can be either formed on the contact surfaces of eyeglasses or on "pads" that can be attached to the contact surfaces.

(b) The Foam Solution to Providing Aeration for the Skin

Another contact surface that will permit air to reach the skin is an open cell, hydrophobic, foam. The prior art does not suggest that foam materials for eyeglass pads should be optimized to permit air to contact the skin. Foams with a very open structure and which are more hydrophobic than skin promote removal of moisture and dry skin. However, although open cell foams allow more air to reach the surface than closed cell foams, they still can inhibit airflow.

Foams are clearly more comfortable than the rough surfaces. The nature of foams is such that they will normally have to be formed on "pads" and attached to the contact surfaces as opposed to being formed as part of the contact surfaces.

(c) The "Pile Surface" Solution to Providing Aeration of the Skin

The preferred surface for providing aeration, good fit and comfort is provided by a "pile surface", e.g., as provided by a hydrophobic "pile fabric". Descriptions of pile fabrics and methods for making pile fabrics can be found in, e.g., Textiles, Fourth Edition, Hollen and Sandler, Copyright 1973 by Macmillan Publishing Company, pp. 154-161; and Understanding Textiles, Tortora, printed by Macmillan Publishing Company 1978, pp. 201-204 and 223, said references being incorporated herein by reference.

The preferred contact/bearing surfaces in pile fabrics that touch the skin are created by the ends of a multitude of thread ends, the ends of individual fibers, or the ends of thread or fiber loops (the "pile"). A pile is formed by using multiple protrusions, like short fibers or threads where one end of each fiber or thread is attached to a backing, or support surface structure, and the other end is left unattached. These unattached ends provide multiple contact points with the skin, and the spaces between, e.g., the ends of the threads and/or loops allow air to move freely to contact the skin. These unattached, free ends form the surface of the pile.

A hydrophobic pile aids moisture removal from the skin surface. As used herein, "pile surface" and/or "pile fabric" are used to encompass both conventional fabrics in which the basic support structure or "backing" for the pile can be either woven, non-woven, and/or knitted cloth and other pile surfaces where the support structure (surface) is a structurally equivalent, preferably planar, surface. Such equivalent support surfaces can be any surface such as rubber, plastic or metal, including even the surface of the eyeglasses.

Hydrophobic pile fabric unlike hydrophilic fabric, e.g., cotton fabric, allows surface moisture to wick away from the skin. Hydrophobic materials like polyolefins, e.g., polyethylene and/or polypropylene; polyesters such as Dacron™; polyamides such as nylons; etc. are suitable for creating a hydrophobic pile structure. Although hydrophobic fibers are usually synthetic like polyester, nylon, etc., natural fibers can be treated to make the fibers more hydrophobic.

As discussed before, solid sheet materials like rubber or plastic, woven fabrics, non-woven fabrics, etc., can all be used as the support structures (backing) for the pile. These solid sheet materials can be useful as moisture barriers, e.g., when water-soluble glue is used to attach the pile structure to the glasses. The preferred fabrics also have a backing that is hydrophobic.

The typical fibers that can be used to form a pile are those that have a denier of from about 100 to about 1000. Higher denier fibers provide more resistance to crushing and lower denier fibers tend to provide a softer feel. Upholstery fabric is designed to resist crushing under the weight of human bodies and therefore will last longer under pressure before the pile fibers are flattened. The size of fibers for upholstery fabric is usually in the range from about 200 to about 600 denier and those fibers have been found to be satisfactory.

The pile members are selected so as to be sufficiently stiff and/or numerous and/or long to resist movement, maintain air passageways, etc. The openings between these ends allow air to reach the skin and the multiple ends of, e.g., the fibers, dig into the skin to provide resistance to slippage in the forward and/or downward directions while not resisting slippage upwards and backwards. Stiffer fibers resist slippage better. When there are many such ends, the pressure of each end on the skin can be quite small.

Hydrophilic fabrics like cotton hold moisture next to the skin and inhibit evaporation/wicking. Also, pile fabrics made from hydrophilic materials such as cotton, e.g., corduroy, also tend to mat down when the skin is wet. However, as discussed before, hydrophilic materials like corduroy can be modified, e.g., by treating them with more hydrophobic materials like Teflon to make them more hydrophobic in which case they are more usable.

Although a pile surface can be formed by attaching short fibers onto the contact surfaces of the eyeglasses, preferably, the pile surface is provided on a pad that is attached to the contact surface of the eyeglasses.

2. The Solutions to Maintain Good Fit

The normal movements of the head usually result in forward and/or downward movement of the eyeglasses. The head is often tilted downward to view objects. Gravity acts to pull the eyeglasses down and there is no natural counter force. Prior attempts to keep eyeglasses in place tried to minimize the movement, but did not encourage counter movement.

The surfaces contacting the skin in conventional eyeglasses made from metal and/or plastic, and in the prior art suggestions of "fixes", have equal resistance to movement in all directions. Therefore, the forces like those provided by gravity, which acts downward on the eyeglasses, tend to move the eyeglasses downward/forward as the head moves back and forth requiring one to push the eyeglasses back into position.

Applicant has found that when the contact surfaces of the eyeglasses have less resistance to movement over the skin in the direction starting from the bottom of the lenses in front of the head and going to the ends of the earpieces at the back of the head as opposed to the direction starting at the end of the earpieces and going forward and downward to the bottom of the lenses in the front, the eyeglasses stay in place better.

As used herein, "backward" and "upward" and "forward" and "downward" all have their normal meanings in explaining the directions of both movements and orientation. However, the ends of the earpieces behind the ears can be moving upward when the earpieces are moving forward. For the purpose of keeping glasses in place there should be more resistance when the glasses move in the direction of the bottom front of the glasses (the lens) starting from the end of the earpieces and there should be improved slippage in the direction of the ends of the earpieces starting from the bottom of the glasses (the lens).

The normal random movements of the head cancel out as the head always returns to a central position. Therefore, when the eyeglass surfaces in contact with the skin allow more movement to the back of the head than to the front of the head and down for the same amount of movement, the eyeglasses tend to stay in position. This net tendency to favor backward/upward movement appears to partially compensate for the inevitable slippage forward/downward of the eyeglasses. The eyeglasses that have the preferred contact surfaces herein appear to provide desirable "repositioning".

In any event, in use, the eyeglasses having the preferred skin contact surfaces described herein stay in position much better than eyeglasses with normal skin contact surfaces. Moreover, if the direction of the preferred contact surface is reversed to favor downward/forward movement, the eyeglasses slip forward and downward much more readily.

The desired effect is similar qualitatively to the action of a ratchet, which permits movement in only one direction. The structures herein are like ratchet teeth that have "ramps" that facilitate sliding in one direction and "tooth points" that resist slippage in the opposite direction by digging into the skin surface so that for the same amount of applied force (momentum) the movement is greater in the backward/upward directions. Such structures are therefore referred to herein as "ratchet-tooth-like" structures or protrusions.

Improved backward/upward movement can also be provided by selectively lowering the frictional resistance of the upward and/or backward sides of the ratchet-tooth-like protrusions. Lower frictional resistance can be achieved by, e.g., smoothing. E.g., one can add a coating like polytetraflouroethylene, available commercially as Teflon™, which has less frictional resistance, to the upward/backward surfaces. One can also increase the frictional resistance of the downward and/or forward sides of the protrusions by making them rougher, or by having the forward/downward tips of protrusions sharper and/or more slanted to the front and/or bottom. A smoother and/or more hydrophobic surface provides less resistance and a rougher and/or more hydrophilic surface provides more resistance. However, hydrophilic surfaces are not desirable since they keep moisture at the skin surface.

(a) The Hard Surface Solution for Maintaining Good Fit

An improvement can be provided to eyeglasses by creating rough hard contact surfaces with surface protrusions that are ridges or bumps with sharp points and/or edges that point downward and/or forward to provide a "ratchet" effect in which the resistance to movement is greater in the forward and/or downward directions. These ratchet-tooth-like protrusions preferably have smooth sloping surfaces on their rear and/or upward sides and less smooth and/or more abrupt surfaces on the front and/or downward sides.

The hard ratchet-tooth-like surfaces can be formed on the contact surfaces of the eyeglass frames (nosepieces, temple pieces, etc.) or can be added using separate pads that are attached, e.g., glued, to the eyeglasses at the contact points. These hard surfaces which provide less resistance to movement in the backward and/or upward directions, can also provide improved skin safety if the valleys between the ratchet-tooth-like protrusions are sufficiently large and continuous, as disclosed hereinbefore, to allow air to contact the skin. The use of a hard surface requires the formation of many ridges and/or teeth to minimize the force exerted on the skin by any one sharp ridge or tip.

(2) The Foam Solution to Maintaining Good Fit

Foams that are soft conform to the skin surface and, especially on the ears, will inhibit movement. In order to move the eyeglasses the foam has to be deformed, which requires work. However, such resistance is in both directions.

Foams, and preferably open celled foams as disclosed hereinbefore, can be molded to create a ratchet-tooth-like surface with less resistance to movement backwards and/or upwards as well as more resistance to movement forwards and/or downwards in order for the eyeglasses to have a tendency to reposition.

As before, the foam will normally be used in the form of a pad.

(c) The Pile Surface Solution to Maintaining Good Fit

The pile surfaces suitable for maintaining good fit, preferably pile fabrics, have piles that are "oriented", i.e., the ends of the fibers, threads, or the extended loops of fibers and/or threads that create the pile are pointed primarily in one direction at an angle from the perpendicular toward the front and toward the bottom of the lenses (forward and/or downward) to create the contact bearing surface. Pile fabrics with the pile slanting predominantly downward/forward at an angle allow the ends of the pile to interact with the skin to resist movement downward and/or forward. Thus, the ends should not be pointed at what is essentially a right angle to the support structure or with equal numbers of ends oriented facing both downward/upward and/or forward/backward. The pile should not be slanting the wrong way, i.e., upward and/or backward, since, as discussed before, this will increase the tendency of the eyeglasses to move out of position.

When the ends of the pile's thread like members are slanted in one direction from the perpendicular with the pile's fiber or thread or loop ends facing forward and/or downward, the head movements upward or backward allow the contact surfaces to advance smoothly backward and/or upward since the pile slides easily in that direction. However, when the head moves forward and/or downward, the ends of the fibers/loops tend to dig into the skin thus resisting the motion.

The ends of the fibers/loops are preferably at an angle that allows them to dig into the skin forward/downward yet allows movement backward/upward. Even small angles, e.g., like about 10 degrees from the perpendicular appear to provide a benefit. Greater angles, e.g., of at least about 30 degrees from the perpendicular, or more, appear to provide more benefit. However, a pile that is perpendicular to its backing and therefore to the eyeglass surface has equal resistance in both directions. When a pile becomes flattened, as occurs after prolonged use, the resistance to movement forward/downward appears to be much less.

Pile fabrics with piles (thread ends) ranging in length from at least about 0.5 mm, preferably at least about 1 mm, more preferably at least about 2 mm, to less than about one cm, preferably less than about one cm, and more preferably less than about 7 mm, and desirably less than about 5 mm, are suitable. The cross sectional area of the threads can vary depending upon the length of the fibers, the number of fibers per square centimeter, the resistance to deformation of the fibers, etc. The backing will normally be thin and/or flexible while maintaining fabric integrity. Flexibility is important for earpiece pads, since the pads are bent when they are attached to the earpieces and any tendency to unroll and flatten will tend to pull the pads away from the earpieces. However, the pads can be bent to conform to the earpieces.

The pile ends need to be stiff or thick enough to resist bending. The optimum angle depends on the stiffness of the fibers, the number of fibers, etc. It is necessary to have greater resistance in one direction to provide the ratchet action. In order to determine whether a pile is satisfactory, one can simply drag a finger in both directions over the pile, or lightly pinch a pile fabric between the thumb and a finger while moving back and forth. One should be able to feel a distinct difference between the resistances in the two directions. This test is very similar to what actually occurs when the pile surface is mounted on the eyeglasses' contact surfaces.

The preferred pile surfaces (fabrics), when oriented so that the direction of least resistance is toward the top of the lenses in front of the head and/or toward the back of the head help keep the eyeglasses in the proper position by providing the ratchet-tooth-like action.

Corduroy, which has been disclosed as a potential pad surface for a nose pad, has "wales" or ridges that run parallel to each other. The orientation, or slant, of the fiber ends, with respect to the ridges, is essentially equal in both directions perpendicular to the ridges. Directional orientation of the pile in a corduroy fabric occurs only along the ridges. Also, corduroy is hydrophilic and this holds moisture next to the skin, which is not desirable.

Pile fabrics that are comfortable to the skin are preferred. Rough fabric materials can be softened by the application of fabric softeners to make them softer. Fabrics that are resistant to "crushing" (flattening) are also desirable, but some crushing can be desirable since a pile fabric structure, especially one with longer fibers sticking out (more "loft") when compressed slightly, conforms better to the surfaces of the ears and/or nose and thus maximizes the surface in contact with the ears/nose which in turn minimizes the force per unit of area Also, when the pile conforms to the skin surfaces, the pile must be rearranged in order for the eyeglasses to move, which requires additional force and thus further increases resistance to movement.

The important criteria for selecting a pile fabric for use herein are based upon the ability to maintain: a degree of loft, i.e., distance between the skin and the pile's backing or support surface; a degree of comfort; and a degree of resistance to movement forward and/or downward while minimizing the resistance to movement backward/upward. As discussed before, the properties of crush resistance and comfort can be found in upholstery fabrics.

C. The Benefits of the Invention

The benefits provided by the skin contact surfaces herein are highly desirable. Tight fitting glasses that have a soft pile fabric surface in contact with the skin are much more comfortable and are less likely to cause sore spots on the ears or nose. The air can freely contact the skin to keep the skin dry. Although discontinuous hard rough surfaces will provide improved aeration of the skin, the preferred pile fabric surfaces are usually more comfortable. Similarly, more compressible open cell foams also can provide cushioning.

When the skin contact surface also provides more resistance to slippage in the forward and/or downward directions than in the backward and/or upward directions, the need for pressure against the ears, head and nose in order to maintain the eyeglasses in position is greatly reduced. Surprisingly, even a relatively small surface area such as provided by nose pads covered with a pile fabric oriented in the preferred direction with the ends facing downward, can provide sufficient net movement in an upward/backward direction to help keep the eyeglasses in place while avoiding the problems caused by moisture being trapped between the nose and the nosepiece. However, increasing the size of the pads and/or the addition of pads placed on the earpieces provides greatly improved performance in that the eyeglasses are kept in place better and the ear pads also minimize damage to the skin of the ears caused by contact and/or moisture. Ear pads between the skin and earpiece should cover at least part of both sides of the earpieces to minimize or eliminate skin contact between the earpiece and the skin.

The surface provided by a pile fabric is typically more comfortable than a rigid surface. Although short fibers can be attached to the eyeglass frame surfaces directly to form a pile surface, especially with the preferred orientation forward and/or down, such a surface tends to be less desirable and requires excellent cleaning to avoid the buildup of undesirable materials which become entrapped and which can provide growth media for bacteria Fabric pile pads, on the other hand, can be removed and replaced when they become dirty or damaged.

D. Pads

Pads are a very desirable way to provide the benefits of the invention. In general, the amount of material used on the contact surfaces is limited for appearance and cost reasons. The color is normally selected to blend in with the color of the eyeglass frames, but the color can be bright or different for fashion reasons. Using pads allows one to change the appearance of the pads, accentuate the appearance of the pads, etc. Some eyeglass wearers will prefer to change the pads in order to coordinate the pads with other visual aspects such as clothing, hair color, the appearance of one's pet, etc.

When pads that have directional slippage are used, they must be applied in the proper orientation. Improper orientation will actually make the slippage worse. Accordingly, it is extremely preferred to have indicia on the pads to inform the user of the correct orientation. The indicia can be on the release cover, if there is a release cover. However, the indicia are desirably visible on the attachment, e.g., adhesive, layer so that they are visible when the pad is being applied. Provision of a marking for the centerline of ear pads is also desirable to facilitate proper positioning on the earpiece. If ear pads are cut to allow the pads to conform to the bend in the earpiece, and if the cuts are near the front edge of the pad, the cuts will tell the user which end should be applied closest to the front of the eyeglasses.

E. Pad Attachment

The pads can be attached to the eyeglasses by any conventional means. One can use the conventional methods of attachment including: glues or adhesives; hook and eye attachments (Velcro™); magnetic attachment means; etc. for any of the pads disclosed herein. The selection of the particular method of attachment is based upon convenience, cost, avoidance of damage to the eyeglasses, and/or ability to keep the pads in place.

Adhesives used to attach pads to the eyeglasses are typically pressure sensitive adhesives. Desirably, the adhesive should maintain the pads in position, but should be easily removed. The adhesive can be any typical pressure sensitive adhesive of the type used on the surface of commercial pads like those sold under the trade name Meijer™ where the pads are foam and are attached to a card that has a release surface.

Other suitable means of attachment make use of double-sided adhesive tapes such as the one sold under the trade name Scotch™, which has adhesive on both sides of a tape and which uses a release strip that is continuous in a spiral configuration. The Scotch permanent double-sided tape (yellow and black plaid) is preferred, especially when attaching fabric to the eyeglasses. The Scotch tape is a very desirable solution for making a quick repair when a commercial pad is unavailable, since a pile fabric can be attached to one side of the double-sided tape, cut, and then the completed pad added to the nose piece or earpiece either before or after being trimmed to fit. Ironing the tape to the fabric can aid in adhesion as well as improving fiber end orientation if the iron is moved only in the direction of the slant of the fiber ends. One should be careful not to completely flatten the pile when ironing. It has also been found that NuSkin®, a product sold to cover cuts and abrasions on skin, can improve adhesion of Scotch tape to fabric when it is applied to the fabric before the tape is applied.

When fabric is used as the contact surface for pads that are attached to the eyeglasses by glue, applicant has found that having fabric without sizing on the backing layer usually improves glue adhesion to the fabric. It is desirable to remove any sizing from fabric, e.g., by washing, but fabric prepared without sizing is preferred. Ironing the tape to the fabric can aid in adhesion as well as improving fiber end orientation if the iron is moved only in the direction of the slant of the fiber ends. One should be careful not to completely flatten the pile when ironing.

Desirably, the glue that is selected will not be softened by moisture, but if it is, then a hydrophobic backing that does not absorb and hold moisture is highly desirable since hydrophilic backings will hold water from, e.g., sweat, so that the adhesive is softened faster. Skin oil also will tend to soften glue. Therefore, desirably, there is a water and/or skin oil barrier between the glue and the skin. The Scotch tapes appear to have an adhesive that is softened by water and/or skin oils.

Another adhesive that can be used for quick repairs is the type of adhesive used to keep pictures in place on walls. Such adhesives are sold under the trade name Stick-E-Tak™ by Clemence. The adhesive can be attached to the back of a pile fabric by spreading the adhesive, then the fabric is attached to the nose piece or ear piece by the adhesive. These adhesives and the Scotch double-sided adhesive tapes have the benefit of being easily removed from the eyeglass surface, but share the drawback of not providing long-term stability. Nonetheless, for short-term service and/or emergency repairs, they are more than adequate.

Ideally, adhesives will be selected for the specific surfaces used. Companies that make and/or sell a variety of adhesives will normally have a number of adhesives that will be satisfactory. Since eyeglasses and/or pads can be made from many different materials, several adhesives should be tried to determine which ones are acceptable.

As discussed before, the pads can be attached with any conventional means including glue/adhesive, Velcro™ (hook and loop combination means), or by magnetic pair attraction. Each of these methods of attachment has an advantage. However, glues and/or adhesives are highly desirable for providing secure attachment without increased bulk or weight.

Since many attachment means are selected for easy removal of the pads, it is desirable to bevel the edges of the pads to minimize the force created when the edges rub against skin, the hair, glasses cases, etc.

Less conventional attachment means can be used to form the pads. One can use tubing, especially elastic tubing, with outer ratchet-tooth-like surfaces, preferably pile surfaces for attaching pads to earpieces. The ratchet-tooth-like protrusions, especially pile members, can be either glued to the outside of the tubing, or formed to be integral with the tubing. Individual pile members can be "glued" to a backing support surface like elastic tubing using either adhesive, or by using some combination of solvent and/or heat to convert either the support surface or support end of the pile threads to the equivalent of glue so that the individual pile members are firmly attached to the backing.

Tubing that is elastic can be pulled over the ends of the earpieces and can be kept in place by the elastic forces. Although glue can also be added to the inside of the tubing to help maintain it in place, it is possible to use the elastic forces of elastic tubing to provide inherent resistance to slippage and minimize the difficulty in removing the tubing. Glue on the inside of the tubing makes it more difficult to slip into place around the earpiece.

For example, elastic, e.g., rubber, tubing with a pile fabric glued to the outside of the tubing by, e.g., rubber cement, is useful. This tubing is pulled over the end of the eyeglasses' earpieces using a lubricant such as glycerin, etc. to facilitate slippage. The lubricant is preferably one that disappears or loses its lubricity quickly so as to maximize the resistance to slippage of the tubing when it is mounted on the earpiece.

Clips can also be used to attach pads to eyeglasses, especially to earpieces. The spring action of clips holds the pads in place. The clips can be molded to fit the individual eyeglass part and then the pile can be attached to the clip. For example, commercially available plastic tubing like polyethylene tubing can be used to create a type of clip. This more rigid tubing with an interior opening that will fit around an earpiece can be sliced lengthwise along one side and "clipped" around the earpieces. This more rigid tubing can then carry the ratchet-tooth-like structures (pile fabric).

For example, tubing made from polyethylene, sliced along one side and covered with a pile fabric mounted on the outside can be used. The resulting pads are typically fairly thick when the most common tubing is used, but thinner walled tubing, especially tubing formed with a longitudinal bend to conform to the normal bend in eyepieces of eyeglasses, can be very desirable since the pads can easily be attached and removed.

Cylindrical pads can also be made using just pile fabric with the pile on the outside. Desirably, the fabric backing is elastic or has a rough or sticky interior surface to resist slippage. Pile fabric formed into a tube with one end closed provides a "sock" for the end of the earpiece. The pile is on the outside of the sock and the interior preferably provides sufficient resistance to slippage to maintain the eyeglasses in a proper position. As with planar pads, it is desirable to provide slits, or two separate pads to better fit any bend in an earpiece. The end of the fabric tubing does not need to be closed, especially when the inside of the tubing resists slippage so as to prevent the tubing slipping forward relative to the earpiece.

Earpiece pads that cover all of the contact area will typically need to have a structure that will permit the pad to fit any bend that exists in the earpiece around the ear. However, using the invention will make it easier for even straight earpieces to be used while still maintaining the eyeglasses in position. When there is a bend, simple cuts on each side of the pad at the point corresponding to where the earpiece bends will allow the pad to separate at the edges to fit the bend. In the alternative, provision of some elasticity will permit the pad to stretch on the outside of an earpieces' bend.

Another option for fitting pads around an earpiece bend includes using two smaller pads, placing one on each side of the bend to cover more of the earpiece. Normally, one will want less of the ear pad for a single pad, or the shorter of two pads where two pads are used, on the front side of the bend. There is normally more contact area with the ear on the backside of the bend and the pad in front of the bend is more noticeable. If one desires to have the ear pad seen, one can lengthen it in one, or more directions so that it is more visible. The pad can surround the end of the earpiece and/or cover the entire earpiece if one desires.

E. Instructions for Using the Improved Eyeglasses and/or Using Pads to Prepare the Improved Eyeglasses Since eyeglasses are mostly worn by people who are not eye professionals, the invention also comprises: improved methods for preparing and/or using eyeglasses with the contact surfaces specified herein, especially methods which include instructions associated with the pads that detail proper procedures for preparing and/or using the eyeglasses. Since the preferred pads used to keep the eyeglasses in positions have to be properly oriented such instructions are necessary, at least initially. Also, instructions for changing pads on a regular basis are needed since soiled pads can cause irritation. Also, it is beneficial to provide instructions which detail the benefits provided by the improved eyeglasses when used properly are helpful to encourage the continued usage of the improved eyeglasses.

Thus, the invention comprises methods of doing business in which the improved eyeglasses possessing skin contact surfaces that provide aeration and/or resistance to slippage, materials for creating the improved eyeglasses possessing skin contact surfaces that provide aeration and/or resistance to slippage, or kits for creating such eyeglasses, are sold in association with instructions that help ensure proper usage and/or the appreciation of the benefits provided by such improved eyewear. It is especially desirable to provide a kit in which materials for creating and/or applying pads to eyeglasses contain, or are in association with, such instructions for use. For example, it is desirable to sell double-sided tape with instructions to use it with the appropriate pile fabric, which can optionally be part of the kit, to form pads when commercial pads are unavailable.

"Instructions", including "instructions for use", can be written, oral, visual, etc. The main criteria are that they be effective to communicate the proper methods of use and/or the benefits that can be obtained. "In association with" can include putting the instructions on the eyeglasses, on the eyeglasses case, or in advertising of any type that indicates that the instructions relate to the improved eyeglasses.

The use of trademarks, trade dress, etc. with the improved eyeglasses, pads, etc. is desirable to provide a degree of assurance that the improved eyeglasses are ones that will function properly.

In preferred methods of doing business the eyeglasses are sold and fitted by eye care professionals such as optometrists to avoid having the eyeglasses fit changed by the later addition of pads to the earpieces and nosepieces. This is especially desirable when the pads are thicker since the distance from the nosepiece to the earpiece where it contacts the back of the ear will need to accommodate the pads' thickness. Preferably, the instructions discussed hereinbefore are provided by an eye care professional, since this could allow the professional to provide a proper fit, while ensuring that the user appreciates the benefits and importance of proper use of eyeglasses, etc. In other methods of doing business, the eyeglass frames are either designed with the preferred surfaces or designed for use with pads to facilitate their use.

In yet other preferred methods of doing business, the eyeglasses and/or the pads to create the eyeglasses are sold with claims for improving and/or maintaining skin condition, preferably with the approval of the United States Food and Drug Administration and/or other official and/or independent organizations that test and/or approve such products.

The drawings illustrate some specific embodiments of the invention.

FIG. 1 shows a typical pair of eyeglasses with glass frame 21, earpieces 23, nosepieces 2 and 3, and ear pads 29 and 30.

Figure 2:
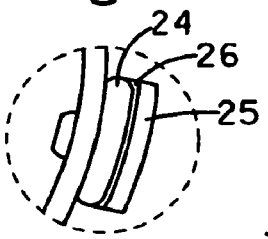
FIG. 2 is a blown up view of the left nosepiece of FIG. 1.

FIG. 2 is a blown up view of nosepiece 2 of FIG. 1. The pad 25 is attached to the nosepiece surface 24 by, e.g., an attachment means 26 such as an adhesive layer. The adhesive layer 26 is typically a contact adhesive layer as discussed hereinbefore and preferably there is a water and/or oil barrier between the skin and the adhesive.

Figure 3:
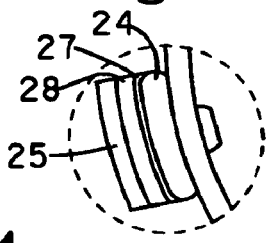
FIG. 3 is a blown up view of the right nosepiece of FIG. 1.

FIG. 3 is a blown up view of nosepiece 3 of FIG. 1 showing a two part attachment means. The pad 25 is attached to the nosepiece 24 by the two part attachment means comprising cooperating layers 27 and 28. The two parts of the attachment means 27 and 28 can be, e.g., the two layers of a magnetic coupling means, the hook and loop layers of Velcro, etc., as discussed hereinbefore.

If the surface of the nosepieces 24 have solid ratchet-tooth-like configurations, the pads 25 and their attachment means 26, or 27 and 28, can be eliminated.

Figure 4:
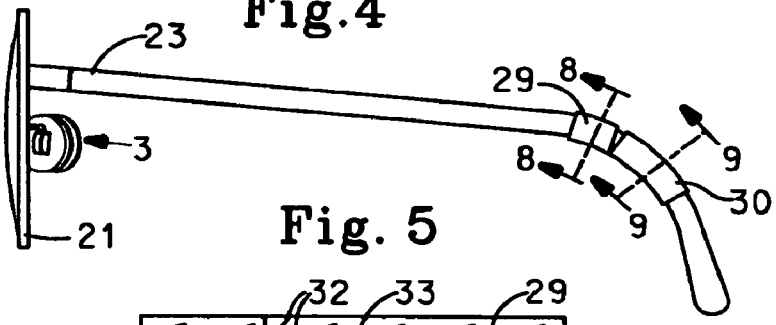
FIG. 4 is a schematic side view of a pair of eyeglasses with nose pads and ear pads attached.

FIG. 4 is a side view of the eyeglasses of FIG. 1 showing the frame 21, the left nosepiece 3, and the left earpiece 23. Ear pads 29 and 30 are attached to earpiece 23 on both sides of the bend in the earpiece. The ear pads can be two separate ear pads as shown in this view, or can be joined at one or more points into one ear pad 29. The V shaped notch between pads 29 and 30 at the curve of the earpiece 23 is formed by the edges of pads 29 and 30. If there is only a single pad 29, the parts of the pad on each side of the curve can be joined by a strip along the bottom of the earpiece 23. When there is only one pad, the pad is cut part way on both sides of the pad before attachment to allow the edges to separate on the outer part of the curve of the earpiece 23 to form the notch. Such cuts and the resulting notches provide for the fitting of a normally non-elastic planar pad to the bend in the earpiece 23 when the single pad 29 is bent around the earpiece 23. The cuts can be in any shape that allows for placement on the earpiece 23 with the pads in proximity to the earpiece surface.

The pad(s) 29/30 can extend further than shown in FIG. 4 in either direction and even surround the end of the earpiece.

A single pad 29 can also be fitted to the curve of the earpiece 23 by using an elastic pad structure instead of the cuts to allow for the pad to stretch on the outside of the curve. In that case, the V shaped notch will not be present.

Figure 5:
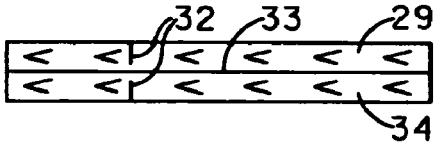
FIG. 5 is a plan view of a pad for an earpiece.

FIG. 5 is a plan view of the adhesive side of a single ear pad 29 with cuts 32 which go in part way on both sides (illustrated) to provide the notches in the pad when it is mounted on the earpiece 23. When there are two pads 29 and 30 the cuts 32 will continue through the pad to divide a single pad 29 into two pads 29 and 30.

The two edges formed by the cuts 32 form the V shaped notch in FIG. 4 for a single pad 29. If there are two pads 29 and 30, the two sides of the V shaped notch are formed by the proximal edges of pads 29 and 30 when the pads are touching.

The line marked for the centerline 33 is placed on the pad(s) 29 and/or 30 to assist in placing the pad(s) on the earpiece 23. The line 33 is placed along the bottom of the eyeglass earpiece 23. When there is only one pad 29, the cuts 32 are placed at the bend of the earpiece 23. When there are two pads 29 and 30, the shorter pad is normally placed in front of the bend and the longer pad behind the bend with the edges of the pads preferably touching. The pad(s) 29 and/or 30 are then folded around the earpiece 23 and pressed against the earpiece 23 to attach the pad(s).

The V-shaped indicia 34, or equivalent directional indicia, are present so that the user can know which direction the ratchet-tooth-like protrusions slant for proper placement. This helps the user to place the pad(s) in the proper orientation on the earpiece 23 so that the ratchet-tooth-like protrusions or the pile protrusions will face forward. The centerline 33 and the V-shaped indicia 34 preferably should be visible on the adhesive side before attachment to be most effective.

The edges of the pad(s) 29 and/or 30 can overlap when attached if the pads are wider than required to completely surround the earpiece 23. Additional pad width can be desirable for the portion of the pad 29 or the pad 30 behind the ear. The additional bulk will inhibit forward movement.

Figure 6:
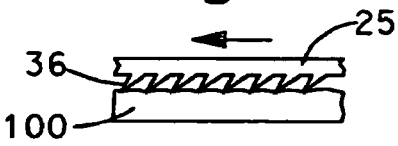
FIG. 6 is a blown up small cross section of the skin-facing surface of a pad having a solid ratchet-tooth-like array interacting with skin.

FIG. 6 is a blown up small cross section of the skin-facing surface of pad 25 (which would also be representative of the surface of pad 29 and/or 30 having solid ratchet-tooth-like protrusions 36 (or a solid nosepiece 24 with solid ratchet-tooth-like protrusions) showing an example of a solid ratchet-tooth-like array 36 in contact with skin 100, with the arrow indicating the forward or downward direction and therefore the direction in which the protrusions slant.

Figure 7:
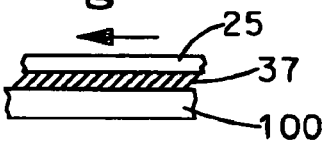
FIG. 7 is a blown up section of the skin-facing surface of a pad showing an array of individual fibers that form a pile interacting with skin.

FIG. 7 is a blown up section of the skin-facing surface of pad 25 (which is also representative of the surface of pad 29 and/or 30) showing the placement of the individual hydrophobic fibers 37 that form a pile in contact with the skin 100, the arrow again indicating the forward or downward direction and the direction of slant of the pile.

Figure 8:
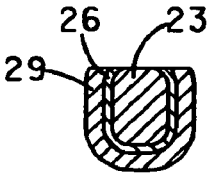
FIG. 8 is a cross section of an earpiece with a mounted pad taken along the line 8-8 in FIG. 4, showing a pad that does not go completely around the earpiece.

FIG. 8 is a cross section of the earpiece 23 with mounted pad 29 taken along the line 8-8 showing a pad that does not go completely around the earpiece 23. The attachment means 26 can be either a single layer like adhesive or a multiple layer attachment means like Velcro. The attachment means 26 can also be a relatively rigid tubing like polyethylene tubing that is sliced along one side and fitted around the earpiece 23, the tubing acting like a clamp and the inner surface of the pad 29 being glued to the outside of the piece of sliced tubing.

Figure 9:
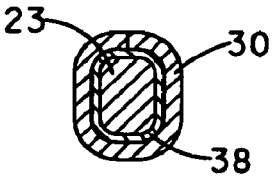
FIG. 9 is a cross section of an earpiece with a mounted pad taken along the line 9-9 in FIG. 4, showing a pad that completely surrounds the earpiece.

FIG. 9 is a cross section of the earpiece 23 with a mounted pad 30 taken along the line 9-9 showing a pad 30 completely surrounding the earpiece 23. This type of structure is representative of a pad 30 that is mounted on an attachment means 38 which is, e.g., a piece of elastic rubber tubing, the inner layer of the pad being attached to the outer surface of the tubing 38 by, e.g., glue. Pad 30 is desirably elastic, so as to permit stretching of the pad to fit the outer portion of the bend in the earpiece. When a pad is completely wrapped around an earpiece 23 and/or one side overlaps the other, the earpiece 23 will also be completely surrounded. If the pad wraps around the earpiece and overlaps, it is desirable to have the part of the pad that is overlapped be thinner so that that the overlap area is thinner. In the case of pile fabrics, the overlapped portion can have a shorter pile or no pile. When the pad is wider than required to surround the earpiece, the adhesive sides of the edges can also be stuck together for improved stability and the excess trimmed off as desired, e.g., to minimize the amount of pad that can be seen.

As discussed before, the option of using the flexible tubing to connect pile fabric in the form of pad(s) 29/30 to the earpieces can also be used, alternatively, by attaching individual fibers or ratchet-tooth-like arrays rather than "fabric" to the tubing directly, either by adhesive, or by "melting" the fiber end, or tubing surface by either solvent or heat.

The pads 25 and/or 29 and/or 30 should preferably cover most of the areas where there is contact with the skin. The pad(s) 25 can also surround at least partially the nosepiece structures on which they are placed.

What is claimed is:

[1. Eyeglasses having lenses, earpieces and nosepieces and at least one surface area that is in contact with wearer's skin that is hydrophobic and provides airways for acration of the skin so as to help keep the skin dry and provides less resistance to slippage in the upward direction, the backward direction, or both the upward and backward direction with respect to the wearer's face to keep the eyeglasses in position.]

[2. The eyeglasses of claim 1 wherein said surface area is in contact with the nose, ears, or nose and ears, and said surface area has airways to permit air to reach the skin and which have a hydrophobic surface to allow moisture to move away from the skin.]

[3. The eyeglasses of claim 2 wherein said surface area is in contact with the nose, ears, or nose and ears, and wherein at least one of said surfaces is a ratchet-tooth-like surface that provides less resistance to slippage in the direction of the ends of the earpieces starting from the bottom of the lenses as compared to the resistance to slippage in the opposite direction to keep the eyeglasses in position.]

[4. The eyeglasses of claim 1 wherein at least one of said surface areas in contact with the skin provides less resistance to slippage in the direction of the ends of the earpieces starting from the bottom of the lenses as compared to the resistance to slippage in the opposite direction to keep the eyeglasses in position.]

[5. The eyeglasses of claim 1 wherein said surfaces are provided by a hydrophobic pile surface where said pile surface is formed from the ends of; fibers; threads, or loops of fiber or threads, or mixtures of at least two of said fibers, and loops of threads, said fibers or threads being more hydrophobic than skin.]

[6. The eyeglasses of claim 5 wherein said pile surface is provided by pile fabric having the individual pile ends slanted in the direction of the bottom of the lenses starting from the ends of the earpieces.]

[7. The eyeglasses of claim 6 wherein said pile fabric is attached to said eyeglasses by adhesive means, hook and loop means, magnetic attraction means, or combinations of these means.]

[8. The eyeglasses of claim 1 wherein said surface area is solid, foam, or a pile.]

[9. A pad for attachment to conventional eyeglasses to create the eyeglasses of claim 1.]

[10. The pad of claim 9 for attachment to either (1) a nose piece of eyeglasses or (2) an earpiece of eyeglasses, said pad comprising a hydrophobic pile fabric having the individual pile ends slanted in one direction and having an adhesive layer attached to the backing of said pile fabric for attaching said fabric to the eyeglasses and, optionally, a release layer over said adhesive layer.]

[11. The pad of claim 10 which either; (1) bears indicia to indicate the direction of the slant of the pile ends; (2) is in a package in association with instructions to place the pad on the eyeglasses with the individual pile ends slanted to the front of the glasses for the pads attached to the earpieces and downward for the pads attached to the nosepiece; or (3) which is characterized by both (1) and (2).]

[12. The pad of claim 10 wherein said adhesive layer is provided by a two sided adhesive tape.]

[13. The pad of claim 10 having indicia to indicate which direction the individual pile ends slant.]

[14. The pad of claim 9 suitable for attachment to an earpiece comprising elastic tubing with an outer pile surface.]

[15. A kit for preparing the pad of claim 9 comprising a two sided adhesive tape, a pile fabric, and instructions for attaching the backing of a pile fabric to one side of the adhesive tape and attaching the other side of the adhesive tape to a skin contact area of eyeglasses.]

[16. The method of preparing a pad for use to create the said surface area of claim 1, comprising attaching backing of a hydrophobic pile fabric to one side of a two-sided adhesive tape; the other side of said two-sided adhesive tape being used to attach the completed pad to the skin contact surface area of the eyeglasses.]

[17. The method of improving the fit of eyeglasses on a wearer, improving the skin safety of said wearer, or improving both said fit and said skin safety, comprising marketing to said wearer a pad, or a kit comprising a two-sided adhesive tape and a hydrophobic pile fabric, which can be used to create eyeglasses according to claim 1 in association with instructions for creating said eyeglasses and with a claim for the benefits of skin safety; improved fit stability; or both improved skin safety and improved fit stability, to improve the acceptance and use of said pad or said kit by the wearer.]

[18. A method of improving the fit of eyeglasses on a wearer, improving the skin safety of said wearer, or improving both said fit and said skin safety, comprising marketing an adhesive pad characterized by having a hydrophobic pile fabric with the pile slanted in one direction for creating the eyeglasses of claim 1 where said pad is marketed in association with instructions to place the pad on the eyeglasses at one or more of the skin contact surfaces with the pile slanted in the direction of the bottom front of the eyeglasses with respect to said wearer's face.]

[19. The method of improving the fit of eyeglasses on a wearer, improving the skin safety of said wearer, or improving both said fit and said skin safety, in which the eyeglasses of claim 1 are fitted on said wearer by an eye care professional.]

[20. The method of improving the fit of eyeglasses on a wearer, improving the skin safety of said wearer, or improving both said fit and said skin safety, by preparing eyeglasses having lenses, earpieces and nosepieces and at least one surface area that is in contact with the wearer's skin that is hydrophobic and provides airways for aeration of the skin so as to help keep the skin dry and provide less resistance to slippage in the upward direction, the backward direction, or both the upward and backward directions, with respect to the wearer's face, to keep the eyeglasses in position, and marketing said eyeglasses in association with a claim for the benefits of: skin safety improved fit stability; or both improved skin safety and improved fit stability, to improve the acceptance and use or said eyeglasses.]

*21. Eyeglasses having lenses, earpieces and nosepieces and at least one surface area that is in contact with wearer's skin and that is fabricated from a hydrophobic material and provides airways for aeration of the skin so as to help keep the skin dry and provides less resistance to slippage in the upward direction, the backward direction, or both the upward and backward directions with respect to the wearer's face to keep the eyeglasses in position, wherein said surface area is on either: the earpieces, the nosepieces, or both the earpieces and nosepieces, and wherein, when the said surface area is only on the nosepieces, the surface area comprises a pile fabric.*

*22. The eyeglasses of claim 21 wherein said surface area is in contact with the nose, ears, or nose and ears, and said surface area has airways to permit air to reach the skin and which have a hydrophobic surface to allow moisture to move away from the skin.*

*23. The eyeglasses of claim 22 wherein said surface area is in contact with the nose, ears, or nose and ears, and wherein at least one of said surfaces is a ratchet-tooth-like surface that provides less resistance to slippage in the direction of the ends of the earpieces starting from the bottom of the lenses as compared to the resistance to slippage in the opposite direction to keep the eyeglasses in position.*

*24. The eyeglasses of claim 21 wherein at least one of said surface areas in contact with the skin provides less resistance to slippage in the direction of the ends of the earpieces starting from the bottom of the lenses as compared to the resistance to slippage in the opposite direction to keep the eyeglasses in position.*

*25. The eyeglasses of claim 21 wherein said surfaces are provided by a hydrophobic pile surface where said pile surface is formed from the ends of: fibers or threads, or loops of fibers or threads, or mixtures of at least two of said fibers, threads, loops of fibers, and loops of threads, said fibers or threads being more hydrophobic than skin.*

*26. The eyeglasses of claim 25 wherein said pile surface is provided by pile fabric having the individual pile ends slanted in the direction of the bottom of the lenses starting from the ends of the earpieces.*

*27. The eyeglasses of claim 26 wherein said pile fabric is attached to said eyeglasses by adhesive means, hook and loop means, magnetic attraction means, or combinations of these means.*

*28. The eyeglasses of claim 21 wherein said surface area is solid, foam, or a pile.*

*29. A pad for attachment to conventional eyeglasses to create the eyeglasses of claim 21.*

*30. The pad of claim 29 for attachment to either (1) a nose piece of eyeglasses or (2) an earpiece of eyeglasses, said pad comprising a hydrophobic pile fabric having the individual pile ends slanted in one direction and having an adhesive layer attached to the backing of said pile fabric for attaching said fabric to the eyeglasses and, optionally, a release layer over said adhesive layer.*

*31. The pad of claim 30 which either: (1) bears indicia to indicate the direction of the slant of the pile ends; (2) is in a package in association with instructions to place the pad on the eyeglasses with the individual pile ends slanted to the front of the glasses for the pads attached to the earpieces and downward for the pads attached to the nosepiece; or (3) which is characterized by both (1) and (2).*

*32. The pad of claim 30 wherein said adhesive layer is provided by a two sided adhesive tape.*

*33. The pad of claim 30 having indicia to indicate which direction the individual pile ends slant.*

*34. The pad of claim 29 suitable for attachment to an earpiece comprising elastic tubing with an outer pile surface.*

*35. A kit for preparing the pad of claim 29 comprising a two sided adhesive tape, a pile fabric, and instructions for attaching the backing of a pile fabric to one side of the adhesive tape and attaching the other side of the adhesive tape to a skin contact area of eyeglasses.*

*36. The method of preparing a pad for use to create the said surface area of claim 21, comprising attaching backing of a hydrophobic pile fabric to one side of a two-sided adhesive tape; the other side of said two-sided adhesive tape being used to attach the completed pad to the skin contact surface area of the eyeglasses.*

*37. The method of improving the fit of eyeglasses on a wearer, improving the skin safety of said wearer, or improving both said fit and said skin safety, comprising marketing to said wearer a pad, or a kit comprising a two-sided adhesive tape and a hydrophobic pile fabric, which can be used to create eyeglasses according to claim 21 in association with instructions for creating said eyeglasses and with a claim for the benefits of skin safety; improved fit stability; or both improved skin safety and improved fit stability, to improve the acceptance and use of said pad or said kit by the wearer.*

*38. A method of improving the fit of eyeglasses on a wearer, improving the skin safety of said wearer, or improving both said fit and said skin safety, comprising marketing an adhesive pad characterized by having a hydrophobic pile fabric with the pile slanted in one direction for creating the eyeglasses of claim 21 where said pad is marketed in association with instructions to place the pad on the eyeglasses at one or more of the skin contact surfaces with the pile slanted in the direction of the bottom front of the eyeglasses with respect to said wearer's face.*

*39. The method of improving the fit of eyeglasses on a wearer, improving the skin safety of said wearer, or improving both said fit and said skin safety, in which the eyeglasses of claim 21 are fitted on said wearer by an eye care professional.*

*40. The method of improving the fit of eyeglasses on a wearer, improving the skin safety of said wearer, or improving both said fit and said skin safety, by preparing eyeglasses having lenses, earpieces and nosepieces and at least one surface area that is in contact with the wearer's skin that is hydrophobic and provides airways for aeration of the skin so as to help keep the skin dry and provide less resistance to slippage in the upward direction, the backward direction, or both the upward and backward directions, with respect to the wearer's face, to keep the eyeglasses in position, and marketing said eyeglasses in association with a claim for the benefits of: skin safety; improved fit stability; or both improved skin safety and improved fit stability, to improve the acceptance and use of said eyeglasses.*

* * * * *